United States Patent
Kinoshita et al.

(10) Patent No.: US 6,176,921 B1
(45) Date of Patent: Jan. 23, 2001

(54) CEMENT DISPERSANTS AND METHOD OF PRODUCING CONCRETE BY USING SAME

(75) Inventors: Mitsuo Kinoshita; Kazuhisa Okada; Masahiro Iida, all of Aichi (JP)

(73) Assignee: Takemoto Yushi Kabushiki Kaisha, Aichi (JP)

(*) Notice: Under 35 U.S.C. 154(b), the term of this patent shall be extended for 0 days.

(21) Appl. No.: 09/251,927

(22) Filed: Feb. 17, 1999

(30) Foreign Application Priority Data

Mar. 3, 1998 (JP) .................................................. 10-069482
Sep. 4, 1998 (JP) .................................................. 10-267319

(51) Int. Cl.$^7$ .................................................. C04B 24/16
(52) U.S. Cl. .................. 106/809; 106/724; 106/725; 106/802; 106/823; 524/650; 524/2; 524/3; 524/4; 524/5; 524/6; 524/7; 524/8; 524/9; 524/10; 526/240; 526/287
(58) Field of Search .................... 524/650, 2–10; 106/724, 725, 802, 809, 823; 526/240, 287

(56) References Cited

U.S. PATENT DOCUMENTS

| | | | |
|---|---|---|---|
| 5,087,648 | * 2/1992 | Kinoshita et al. | 524/3 |
| 5,290,869 | * 3/1994 | Kinoshita et al. | 525/291 |
| 5,362,829 | * 11/1994 | Kinoshita et al. | 526/240 |
| 5,466,289 | * 11/1995 | Yonezawa et al. | 106/809 |
| 5,911,820 | * 6/1999 | Satoh et al. | 106/823 |
| 5,919,300 | * 7/1999 | Burge et al. | 106/727 |
| 5,919,881 | * 7/1999 | Kinoshita et al. | 526/287 |

* cited by examiner

*Primary Examiner*—Elizabeth D. Wood
(74) *Attorney, Agent, or Firm*—Majestic, Parsons, Siebert & Hsue P.C.

(57) ABSTRACT

A cement dispersant composed of water-soluble vinyl copolymers which include specified kinds of constituent units at specified ratios and of which the weight average molecular weight pullulan converted by GPC method is 15000–150000 and the ratio of weight average molecular weight to number average molecular weight is 2–7 is used together with cement, aggregates and water to produce concrete with the water-to-cement ratio of 20–45%.

12 Claims, No Drawings

CEMENT DISPERSANTS AND METHOD OF PRODUCING CONCRETE BY USING SAME

BACKGROUND OF THE INVENTION

This invention relates to cement dispersants and methods of how to use them to produce better concrete. At work sites where cement compositions are used, it is important to be able to provide high fluidity to cement compositions, to reduce the drop in the provided fluidity with time ("the slump loss") and to obtain a sufficient early strength during the initial period of hardening such that the frames can be removed quickly and the work efficiency can be thereby improved. This invention relates to cement dispersants which can respond to such requirements, as well as methods of using such cement dispersants to produce concrete with improved quality. This invention related also to concrete produced by using such a cement dispersant.

Examples of prior art cement dispersant for providing fluidity to cement compositions include salts of high condensates of naphthalene sulfonic acid formaldehyde and melamine sulfonic acid formaldehyde, as well as water-soluble vinyl copolymers. Cement compositions prepared by using salts of high condensates of naphthalene sulfonic acid formaldehyde or melamine sulfonic acid formaldehyde, however, have the problem of a high slump loss. Those prepared by using water-soluble vinyl copolymers of the conventionally proposed kind (such as disclosed in Japanese Patent Publications Tokko 58-38380, 59-18338 and 5-11057 and U.S. Pat. Nos. 4,962,173, 5,087,648, 5,290,869 and 5,362,829) have smaller slump losses but there are problems wherein their setting times become longer and hence a sufficient early strength cannot be obtained during the early period of hardening. This problem is particularly significant with high-strength cement compositions with a limited water-to-cement ratio.

SUMMARY OF THE INVENTION

The problem to be overcome by the present invention is that prior art cement dispersants could produce only cement compositions with a large slump loss or incapable of providing a sufficiently large early strength, this problem being particularly significant with high-strength cement compositions with a limited water-to-cement ratio.

The present invention was accomplished as a result of investigations by the present inventors and is based on their discovery that water-soluble vinyl copolymers constituting of specified kinds of constituent units (herein referred to simply as "units") at a specified ratio and having both the weight average molecular weight and the ratios between the weight average molecular weight and the number average molecular weight within a specified range are suitable as a cement dispersant.

DETAILED DESCRIPTION OF THE INVENTION

This invention relates to cement dispersants which are water-soluble vinyl copolymers constituting of 40–80 molar % of Unit A shown below by Formula (1), 0.5–20 molar % of Unit B shown below by Formula (2), 0.2–18 molar % of Unit C shown below by Formula (3) and 2–40 molar % of Unit D shown below by Formula (4) such that the total is 100 molar %, the weight average molecular weight (hereinafter always pullulan converted by GPC method) being 15000–150000 and the ratio of weight average molecular weight to number average molecular weight being 2–7, Formulas (1)–(5) being as follows:

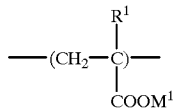 (Formula 1)

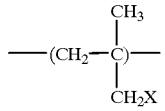 (Formula 2)

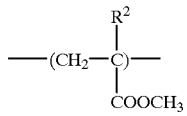 (Formula 3)

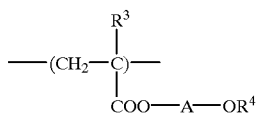 (Formula 4)

where $R^1$, $R^2$ and $R^3$ are each either H or $CH_3$, $R^4$ is H or an alkyl group with 1–3 carbon atoms, X is a group shown below by Formula (5) or (6),

 (Formula 5)

 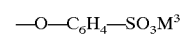 (Formula 6)

A is the residual group obtainable by removing all hydroxyl groups from polyether diol with the repetition number of oxyalkylene units (which consist either only of oxyethylene units or of both oxyethylene and oxypropylene units) being 5–109, $M^1$ is H, an alkali metal, an alkali earth metal, ammonium or an organic amine, and $M^2$ and $M^3$ are each an alkali metal, an alkali earth metal, ammonium or an organic amine.

Cement dispersants of this invention are a water-soluble vinyl copolymers having four constituent units described above but those having as Unit D both Unit E shown below by Formula (7) and Unit F shown below by Formula (8) are preferred:

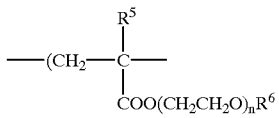 (Formula 7)

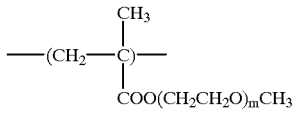 (Formula 8)

where $R^5$ is H or $CH_3$, $R^6$ is an alkyl group with 1–3 carbon atoms, n is an integer 40–109 and m is an integer 5–25. In other words, preferred kinds of water-soluble vinyl copolymers according to this invention include not only Units A, B and C shown by Formulas (1), (2) and (3) but also a relatively long polyoxyethylene graft chain due to Unit E of Formula (7) and a relatively short chain polyoxyethylene graft chain.

These constituent Units A, B, C and D, or Units A, B, C, E and F in the case of an aforementioned preferred example, can all be formed by copolymerizing corresponding vinyl monomers. Examples of vinyl monomers which form Unit A shown by Formula (1) include (1) (meth)acrylic acid, and (2) alkali metal salts, alkali earth metal salts and organic amine salts of (meth)acrylic acid. Of these, alkali metal salts such as sodium and potassium salts of (meth)acrylic acid are preferred.

Examples of vinyl monomers which form Unit B shown by Formula (2) include (1) alkali metal salts, alkali earth metal salts and organic amine salts of methallyl sulfonic acid, and (2) alkali metal salts, alkali earth metal salts and organic amine salts of p-methallyl oxybenzene sulfonic acid. Of these, alkali metal salts such as sodium and potassium salts of methallyl sulfonic acid are preferred.

Examples of vinyl monomers which form Unit C shown by Formula (3) include methyl acrylate and methyl methacrylate. Of these, methyl acrylate is preferred.

Examples of vinyl monomers which form Unit D shown by Formula (4) include (1) alkoxy polyoxyalkylene glycol (meth)acrylate with 1–3 carbon atoms and (2) polyoxyalkylene glycol mono(meth)acrylate, both with repetition number of oxyalkylene units 5–109. Examples of (1) above include methoxy polyethylene glycol (meth)acrylate, methoxy polyethylene glycol polypropylene glycol (meth)acrylate, methoxy polypropylene glycol (meth)acrylate, ethoxy polyethylene glycol (meth)acrylate, ethoxy polyethylene glycol polypropylene glycol (meth)acrylate, ethoxy polypropylene glycol (meth)acrylate, n-propoxy polyethylene glycol (meth)acrylate, n-propoxy polyethylene glycol polypropylene glycol (meth)acrylate, isopropoxy polyethylene glycol mono(meth)acrylate, and isopropoxy polyethylene glycol polypropylene glycol (meth)acrylate. Examples of (2) above include polyoxyalkylene glycol mono(meth) acrylates such as polyethylene glycol mono(meth)acrylate, polyethylene glycol polypropylene glycol mono(meth) acrylate, and polypropylene glycol mono(meth)acrylate. Of these, methoxy polyethylene glycol methacrylate and polyethylene glycol monomethacrylate with oxyalkylene units including only oxyethylene units and their repetition number in the range of 26–95 are preferred.

Examples of vinyl monomers which form Unit E shown by Formula (7) include alkoxy polyethoxyethyl (meth) acrylates with 1–3 carbon atoms and the repetition number of oxyethylene units in the range of 40–109 such as methoxy polyethoxyethyl (meth)acrylate, ethoxypolyethoxyethyl (meth)acrylate, n-propoxy polyethoxyethyl (meth)acrylate, and isopropoxy polyethoxyethyl (meth)acrylate. Of these, methoxy polyethoxyethyl methacrylates with the repetition number of oxyethylene units in the range of 55–100 are preferred.

Examples of vinyl monomers which form Unit F shown by Formula (8) include methoxy polyethoxyethyl methacrylates with the repetition number of oxyethylene units in the range of 5–25. Of these, methoxy polyethoxyethyl methacrylates with the repetition number of oxyethylene units in the range of 7–23 are preferred.

Water-soluble vinyl copolymers to be used as a cement dispersant according to this invention may be obtained by radical copolymerization of vinyl monomers forming Units A–D, or preferably Units A, B, C, E and F at a specified copolymerization ratio in the presence of a radical initiator. The radical copolymerization can be carried out by aqueous solution polymerization using water or a mixed solvent with water and a water-soluble organic solvent either continuously or by batches. For example, each of the vinyl monomers is initially dissolved in water to prepare an aqueous solution with pH 4.5–6.5 containing these vinyl monomers by 10–40 weight % as their total. Next, a radical initiator is added to this aqueous solution within a nitrogen gas atmosphere to carry out a radical copolymerization reaction at 50–70° C. for 5–8 hours and to thereby obtain water-soluble vinyl copolymer. Any radical initiator which generates radicals by decomposing at the reaction temperature of copolymerization may be used for the copolymerization reaction of either of the vinyl monomers, but the use of a water-soluble radical initiator is preferred. Examples of such water-soluble radical initiator include persulfates such as potassium persulfate and ammonium persulfate, hydrogen peroxide, and 2,2-azobis (2-amidinopropane) dihydrochloride. They may be combined with a reducing agent such as a sulfite and L-ascorbic acid or amines to be used as a redox initiator.

As described above, water-soluble vinyl copolymers to be used as a cement dispersant according to this invention are characterized as comprising Units A–D, or preferably Units A, B, C, E and F at a specified ratio, but they are also required to have the weight average molecular weight (pullulan converted by GPC method) and the ratio of weight average molecular weight to number average molecular weight (hereinafter denoted as Mw/Mn) within specified ranges. Adjustment of such molecular weight distributions can be effected by a conventional method of appropriately controlling concentrations of the vinyl monomers in the system for radical copolymerization, the pH of the polymerizing system, its temperature and the addition of a chain transfer agent. In order to obtain a water-soluble vinyl copolymer with a desired molecular weight distribution, it is preferred to set the pH value of the polymerizing system at 4.0–6.5 and to add a chain transfer agent such as 2-mercapto ethanol, 2-mercapto propionic acid, 3-mercapto propionic acid, thioglycol acid and thioglycerine to the polymerizing system. Since vinyl monomers forming Unit B function as a themselves, this property may be appropriately taken advantage of.

The water-soluble vinyl copolymers constituting of Units A–D, to be used as a cement dispersant according to this invention, contain Unit A by 40–80 molar % or preferably by 55–72 molar %, Unit B by 0.5–20 molar % or preferably 3–18 molar %, Unit C by 0.2–18 molar % or preferably 3–15 molar %, and Unit D by 2–40 molar % or preferably 3–30 molar % (such that the total is 100 molar %). Those constituting of Units A, B, C, E and F contain Unit A by 40–80 molar % or preferably 55–72 molar %, Unit B by 0.5–20 molar % or preferably 3–18 molar %, Unit C by 0.2–18 molar % or preferably 3–15 molar %, Unit E by 2–15 molar % or preferably 3–12 molar %, and Unit F by 0.5–15 molar % or preferably 1–12 molar % (such that the total is 100 molar %).

The water-soluble vinyl copolymers to be used as a cement dispersant according to this invention are further characterized in that their weight average molecular weight be 15000–150000 or preferably 25000–70000 and that their ratio Mw/Mn be 2–7 or preferably 3–6.5.

For preparing cement compositions by using a cement dispersant of this invention, different kinds of agents may be used together, depending of the purpose. Examples of such agents include air entraining agents, antifoaming agents, waterproofing agents, hardening accelerators and antiseptics. They may be added with kneading water when the cement composition is prepared or after the cement composition has been mixed and kneaded.

Cement dispersants of this invention can be used for cement compositions such as mortars and concrete prepared by using a binder composed of cement or a mixture of cement and a microscopic powder admixture. Examples of cement which can be used include many kinds of portland cement such as ordinary portland cement, high early strength portland cement and moderate heat portland cement, blast furnace cement, fly ash cement, silica fume cement as well as many other kinds of blended cement. Examples of microscopic powder admixture include silica fume, blast-furnace slag and fly ash. Cement dispersants of this invention are normally mixed at a ratio of 0.05–2.0 weight parts, or preferably 0.1–1.5 weight parts, as converted to solid component per 100 weight parts of the binder comprised of cement or a mixture of cement and a microscopic powder admixture.

As explained above, water-soluble vinyl copolymers to be used as a cement dispersant according to this invention are characterized not only as constituting of Units A–D, or preferably Units A, B, C, E and F, at a specified ratio, but also as having weight average molecular weight and Mw/Mn within specified ranges. Those constituting of Units A, B, C, E and F are particularly characterized as containing in the molecule both a relatively long polyoxyethylene graft chain and a relatively short polyoxyethylene graft chain. Cement dispersants of this invention with such particular characteristic are effective not only when used with ordinary cement compositions with the water/cement ratio in excess of 45% but also with cement compositions with the water/cement ratio 20–45% such as concrete. They can provide high fluidity even to high-strength concrete with the water/cement ratio limited to 20–45%, reduce the slump loss, limit the setting time delay and realize a sufficient early strength.

The invention is described next by way of the following thirteen embodiments.

EMBODIMENT (1)

Cement dispersant using water-soluble vinyl copolymer with sodium methacrylate as Unit A by 63 molar %, sodium methallyl sulfonate as Unit B by 15 molar %, methyl acrylate as Unit C by 8 molar % and methoxy poly(p=45) ethylene glycol monomethacrylate (the repetition number of oxyethylene units being indicated hereinafter by "p") as Unit D by 14 molar % (such that the total is 100 molar %), of which the weight average molecular weight is 42500 and Mw/Mn=4.6.

EMBODIMENT (2)

Cement dispersant using water-soluble vinyl copolymer with sodium methacrylate as Unit A by 67 molar %, sodium methallyl sulfonate as Unit B by 15 molar %, methyl acrylate as Unit C by 11 molar % and methoxy poly(p=68) ethylene glycol monomethacrylate as Unit D by 7 molar % (the total being 100 molar %), of which the weight average molecular weight is 46000 and Mw/Mn=4.8.

EMBODIMENT (3)

Cement dispersant using water-soluble vinyl copolymer with sodium methacrylate as Unit A by 72 molar %, sodium methallyl sulfonate as Unit B by 9 molar %, methyl acrylate as Unit C by 14 molar % and methoxy poly(p=90)ethylene glycol monomethacrylate as Unit D by 5 molar % (the total being 100 molar %)7 of which the weight average molecular weight is 59000 and Mw/Mn=5.7.

EMBODIMENT (4)

Cement dispersant using water-soluble vinyl copolymer with sodium methacrylate as Unit A by 60 molar %, sodium methallyl sulfonate as Unit B by 5 molar %, methyl acrylate as Unit C by 10 molar % and methoxy poly(p=45)ethylene glycol monomethacrylate as Unit D by 25 molar % (the total being 100 molar %), of which the weight average molecular weight 40700 is and Mw/Mn=4.3.

EMBODIMENT (5)

Cement dispersant using water-soluble vinyl copolymer with sodium acrylate as Unit A by 55 molar %, sodium p-methallyl oxybenzene sulfonate as Unit B by 15 molar %, methyl acrylate as Unit C by 3 molar % and methoxy poly(p=45)ethylene glycol monomethacrylate as Unit D by 27 molar % (the total being 100 molar %), of which the weight average molecular weight is 51500 and Mw/Mn=3.2.

EMBODIMENT (6)

Cement dispersant using water-soluble vinyl copolymer with sodium methacrylate as Unit A by 62 molar % sodium p-methallyl oxybenzene sulfonate as Unit B by 12 molar %, methyl acrylate as Unit C by 6 molar % and methoxy poly(p=45)ethylene glycol monomethacrylate as Unit D by 20 molar % (the total being 100 molar %), of which the weight average molecular weight is 38700 and Mw/Mn=3.5.

EMBODIMENT (7)

Cement dispersant using water-soluble vinyl copolymer with sodium methacrylate as Unit A by 70 molar %, sodium methallyl sulfonate as Unit B by 14 molar %, methyl acrylate as Unit C by 10 molar % and polyethylene glycol (p=90) monomethacrylate as Unit D by 6 molar % (the total being 100 molar %), of which the weight average molecular weight is 54800 and Mw/Mn=5.1.

EMBODIMENT (8)

Cement dispersant using water-soluble vinyl copolymer with sodium methacrylate as Unit A by 62 molar %, sodium methallyl sulfonate as Unit B by 12 molar %, metlhyl acrylate as Unit C by 12 molar %, methoxypolyethoxyethyl (n in Formula (7)=68) methacrylate as Unit E by 8 molar % and methoxypolyethoxyethyl (m in Formula (8)=9) methacrylate as Unit F by 6 molar % (the total being 100 molar %), of which the weight average molecular weight is 66600 and Mw/Mn=4.5.

EMBODIMENT (9)

Cement dispersant using water-soluble vinyl copolymer with sodium methacrylate as Unit A by 57 molar %, sodium methallyl sulfonate as Unit B by 15 molar %, methyl acrylate as Unit C by 14 molar %, methoxypolyethoxyethyl (n in Formula (7)=68) methacrylate as Unit E by 10 molar % and methoxypolyethoxyethyl (m in Formula (8)=23) methacrylate as Unit F by 2 molar % (the total being 100 molar %), of which the weight average molecular weight is 38500 and Mw/Mn=3.5.

EMBODIMENT (10)

Cement dispersant using water-soluble vinyl copolymer with sodium methacrylate as Unit A by 72 molar %, sodium methallyl sulfonate as Unit B by 8 molar %, methyl acrylate as Unit C by 5 molar %, methoxypolyethoxyethyl (n in Formula (7)=95) methacrylate as Unit E by 4 molar % and methoxypolyethoxyethyl (m in Formula (8)=9) methacrylate as Unit F by 11 molar % (the total being 100 molar %), of which the weight average molecular weight is 62900 and Mw/Mn=3.4.

EMBODIMENT (11)

Cement dispersant using water-soluble vinyl copolymer with sodium methacrylate as Unit A by 65 molar %, sodium methallyl sulfonate as Unit B by 5 molar %, methyl acrylate as Unit C by 10 molar %, methoxypolyethoxyethyl (n in Formula (7)=45) methacrylate as Unit E by 12 molar % and methoxypolyethoxyethyl (m in Formula (8)=23) methacrylate as Unit F by 8 molar % (the total being 100 molar %), of which the weight average molecular weight is 114700 and Mw/Mn=3. 1.

EMBODIMENT (12)

Cement dispersant using water-soluble vinyl copolymer with sodium acrylate as Unit A by 70 molar %, sodium p-methallyl oxybenzene sulfonate as Unit B by 10 molar %, methyl acrylate as Unit C by 6 molar %, isopropoxypolyethoxyethyl (n in Formula (7)=55) acrylate as Unit E by 11 molar % and methoxypolyethoxyethyl (m in Formula (8)=9) methacrylate as Unit F by 3 molar % (the total being 100 molar %), of which the weight average molecular weight is 89700 and Mw/Mn=3.9.

EMBODIMENT (13)

Cement dispersant using water-soluble vinyl copolymer with sodium methacrylate as Unit A by 58 molar %, sodium p-methallyl oxybenzene sulfonate as Unit B by 18 molar %, methyl acrylate as Unit C by 8 molar %, methoxypolyethoxyethyl (n in Formula (7)=68) methacrylate as Unit E by 10 molar % and methoxypolyethoxyethyl (m in Formula (8)=23) methacrylate as Unit F by 6 molar % (the total being 100 molar %), of which the weight average molecular weight is 51000 and Mw/Mn=6.0.

EXAMPLES

The invention will be described next by way of examples but these examples are not intended to limit the scope of the invention. In what follows, "parts" shall mean "weight parts" and "%" shall mean "weight % excluding the weight of air", unless otherwise noted.

Part 1 (Synthesis of water-soluble vinyl copolymers)

Synthesis of Test Example 1

Methacrylic acid 103 parts (1.20 moles), sodium methallyl sulfonate 47 parts (0.29 moles), methyl acrylate 13 parts (0.15 moles), methoxypoly(p=45)ethylene glycol monomethacrylate 559 parts (0.27 moles) and water 1500 parts were placed inside a reactor vessel, and after a 30% water solution of sodium hydroxide 90 parts was added to adjust the pH and to obtain a uniform solution, the atmosphere was replaced with nitrogen gas. The pH was of the reacting system was 5.8. The temperature of the reacting system was maintained at 60° C. by means of a temperature bath and a polymerization process was started by adding a 20% water solution of sodium persulfate 30 parts by titration over 3 hours. The polymerization process was continued for 2 hours more to conclude the polymerization. Thereafter, a 30% water solution of sodium hydroxide 10 parts was added for complete neutralization to obtain a reaction product. After a portion of the product thus obtained was condensed inside an evaporator, it was precipitated and refined inside a mixed acetone/isopropanol solvent and dried to obtain water-soluble vinyl copolymer (Test Example 1). This water-soluble vinyl copolymer (Test Example 1) was analyzed by NMR, elemental analysis, titration method and GPC and was found to be a water-soluble vinyl copolymer having sodium methacrylate as Unit A by 63 molar %, sodium methallyl sulfonate as Unit B by 15 molar %, methyl acrylate as Unit C by 8 molar % and methoxypoly(p=45) ethylene glycol monomethacrylate as Unit D by 14 molar % (the total being 100 weight %), of which the weight average molecular weight was 42500 and Mw/Mn=4.6.

Synthesis of Test Example 2

Methacrylic acid 153 parts (1.57 moles), sodium methallyl sulfonate 63 parts (0.40 moles), methyl acrylate 23 parts (0.27 moles), methoxypoly(p=68)ethylene glycol monomethacrylate 560 parts (0.18 moles) and water 1600 parts were placed inside a reactor vessel, and after a 30% water solution of sodium hydroxide 147 parts was added to adjust the pH and to obtain a uniform solution, the atmosphere was replaced with nitrogen gas. The pH was of the reacting system was 5.5. The temperature of the reacting system was maintained at 60° C. by means of a temperature bath and a polymerization process was started by adding a 20% water solution of sodium persulfate 40 parts by titration over 3 hours. The polymerization process was continued for 3 hours more to conclude the polymerization. Thereafter, a 30% water solution of sodium hydroxide 63 parts was added for complete neutralization to obtain a reaction product. After a portion of the product thus obtained was condensed inside an evaporator, it was refined and dried by using a mixed solvent to obtain water-soluble vinyl copolymer (Test Example 2). This water-soluble vinyl copolymer (Test Example 2) was analyzed by NMR, elemental analysis, titration method and GPC and was found to be a water-soluble vinyl copolymer having sodium methacrylate as Unit A by 67 molar %, sodium methallyl sulfonate as Unit B by 15 molar %, methyl acrylate as Unit C by 11 molar % and methoxypoly(p=68)ethylene glycol monomethacrylate as Unit D by 7 molar % (the total being 100 weight %), of which the weight average molecular weight was 46000 and Mw/Mn=4.8.

Synthesis of Test Examples 3–13

Water-soluble vinyl copolymers (Test Examples 3–13) were similarly obtained as explained above for the production of Test Examples 1 and 2. Their compositions are shown in Table 1.

Synthesis of Comparison Example 1

Methacrylic acid 103 parts (1.20 moles), sodium methallyl sulfonate 14 parts (0.086 moles), methoxypoly(p=45) ethylene glycol monomethacrylate 891 parts (0.428 moles) and water 2100 parts were placed inside a reactor vessel, and after a 30% water solution of sodium hydroxide 160 parts was added to adjust the pH and to obtain a uniform solution, the atmosphere was replaced with nitrogen gas. The pH was of the reacting system was 9.2. The temperature of the reacting system was maintained at 60° C. by means of a temperature bath and a polymerization process was started by adding a 20% water solution of sodium persulfate 50 parts by titration over 3 hours to obtain a reaction product. After a portion of the product thus obtained was condensed inside an evaporator, it was refined and dried by using a mixed solvent to obtain water-soluble vinyl copolymer (Comparison Example 1). This water-soluble vinyl copolymer (Comparison Example 1) was analyzed similarly as explained above and was found to be a water-soluble vinyl copolymer having sodium methacrylate as Unit A by 70 molar %, sodium methallyl sulfonate as Unit B by 5 molar %, and methoxypoly(p=45)ethylene glycol monomethacrylate as Unit D by 25 molar % (the total being 100 weight %), of which the weight average molecular weight was 62500 and Mw/Mn=8.3.

Synthesis of Comparison Examples 2–15

Water-soluble vinyl copolymers (Comparison Examples 2–15) were similarly obtained as explained above for the production of Comparison Example 1. Their compositions are shown in Table 2.

TABLE 1

| | | | | | Kinds and molar % of constituent Units | | | | | | | WAMW | |
|---|---|---|---|---|---|---|---|---|---|---|---|---|---|
| | Unit A | | Unit B | | Unit C | | Unit D | | Unit E | | Unit F | | Mw/Mn |
| | | | | | Test Example: | | | | | | | | |
| 1 | A-1 | 63 | B-1 | 15 | C-1 | 8 | D-1 | 14 | — | | — | | 42500 | 4.6 |
| 2 | A-1 | 67 | B-1 | 15 | C-1 | 11 | D-2 | 7 | — | | — | | 46000 | 4.8 |
| 3 | A-1 | 72 | B-1 | 9 | C-1 | 14 | D-3 | 5 | — | | — | | 59000 | 5.7 |
| 4 | A-1 | 60 | B-1 | 5 | C-1 | 10 | D-1 | 25 | — | | — | | 40700 | 4.3 |
| 5 | A-2 | 55 | B-2 | 15 | C-1 | 3 | D-1 | 27 | — | | — | | 51500 | 3.2 |
| 6 | A-1 | 62 | B-2 | 12 | C-1 | 6 | D-1 | 20 | — | | — | | 38700 | 3.5 |
| 7 | A-1 | 70 | B-1 | 14 | C-1 | 10 | D-4 | 6 | — | | — | | 54800 | 5.1 |
| 8 | A-1 | 62 | B-1 | 12 | C-1 | 12 | — | | E-1 | 8 | F-1 | 6 | 66600 | 4.5 |
| 9 | A-1 | 57 | B-1 | 15 | C-1 | 14 | — | | E-1 | 10 | F-2 | 2 | 38500 | 3.5 |
| 10 | A-1 | 72 | B-1 | 8 | C-1 | 5 | — | | E-2 | 4 | F-1 | 11 | 62900 | 3.4 |
| 11 | A-1 | 65 | B-1 | 5 | C-1 | 10 | — | | E-3 | 12 | F-2 | 8 | 114700 | 3.1 |
| 12 | A-2 | 70 | B-2 | 10 | C-1 | 6 | — | | E-4 | 11 | F-1 | 3 | 89700 | 3.9 |
| 13 | A-3 | 58 | B-2 | 18 | C-1 | 8 | — | | E-1 | 10 | F-2 | 6 | 51000 | 6.0 |

In Table 1 and thereafter:
WAMW: Weight average molecular weight

TABLE 2

| | | | | | Kinds and molar % of constituent Units | | | | | | | | | WAMW | |
|---|---|---|---|---|---|---|---|---|---|---|---|---|---|---|---|
| | Unit A | | Unit B | | Unit C | | Unit D | | Unit E | | Unit F | | Others | | Mw/Mn |
| | | | | | Comparison Example: | | | | | | | | | | |
| 1 | A-1 | 70 | B-1 | 5 | — | | D-1 | 25 | — | | — | | — | | 62500 | 8.3 |
| 2 | A-1 | 73 | — | | — | | D-1 | 27 | — | | — | | — | | 51000 | 5.8 |
| 3 | A-1 | 65 | — | | C-1 | 10 | D-1 | 25 | — | | — | | — | | 118000 | 6.5 |
| 4 | A-1 | 50 | B-1 | 25 | C-1 | 5 | D-1 | 20 | — | | — | | — | | 9800 | 12.5 |
| 5 | A-1 | 65 | B-1 | 8 | C-1 | 7 | D-2 | 20 | — | | — | | — | | 76000 | 8.7 |
| 6 | A-1 | 70 | B-2 | 0.3 | C-1 | 6.7 | D-3 | 23 | — | | — | | — | | 127000 | 6.8 |
| 7 | A-1 | 60 | B-2 | 18 | C-1 | 10 | D-1 | 12 | — | | — | | — | | 31000 | 1.8 |
| 8 | A-1 | 76 | B-1 | 15 | C-1 | 5 | — | | — | | — | | X-1 | 4 | 89000 | 7.5 |
| 9 | A-1 | 50 | B-1 | 5 | C-1 | 5 | — | | — | | — | | X-2 | 40 | 22500 | 4.7 |
| 10 | A-1 | 45 | B-1 | 3 | C-1 | 2 | D-1 | 50 | — | | — | | — | | 72600 | 6.3 |
| 11 | A-1 | 63 | — | | C-1 | 8 | D-1 | 14 | — | | — | | X-3 | 15 | 38000 | 4.2 |
| 12 | A-2 | 48 | B-2 | 10 | C-1 | 7 | — | | — | | — | | X-4 | 35 | 55700 | 5.9 |
| 13 | A-1 | 60 | B-2 | 10 | C-1 | 10 | — | | E-3 | 5 | F-1 | 5 | X-3 | 10 | 10000 | 3.2 |
| 14 | A-1 | 65 | — | | C-1 | 5 | — | | E-1 | 10 | F-1 | 10 | X-3 | 10 | 69300 | 3.5 |
| 15 | A-1 | 65 | B-1 | 10 | C-1 | 5 | — | | E-2 | 10 | — | | X-4 | 10 | 124000 | 3.1 |

In Tables 1 and 2:
A-1: Unit of sodium methacrylate
A-2: Unit of sodium acrylate
A-3: Unit of methacrylic acid
B-1: Unit of sodium methallyl sulfonate
B-2: Unit of sodium p-methallyl oxybenzene sulfonate
C-1: Unit of methyl acrylate
D-1: Unit of methoxy poly(p = 45)ethylene glycol methacrylate
D-2: Unit of methoxy poly(p = 68)ethylene glycol methacrylate
D-3: Unit of methoxy poly(p = 90)ethylene glycol methacrylate
D-4: Unit of polyethylene glycol (p = 90) monomethacrylate
E-1(D-2): Unit of methoxypolyethoxyethyl (n in Formula (7) = 68) methacrylate
E-2: Unit of methoxypolyethoxyethyl (n in Formula (7) = 95) methacrylate
E-3(D-1): Unit of methoxypolyethoxyethyl (n in Formula (7) = 45) methacrylate
E-4: Unit of isopropoxy polyethoxyethyl (n in Formula (7) = 55) acrylate
F-1: Unit of methoxypolyethoxyethyl (m in Formula (8) = 9) methacrylate
F-2: Unit of methoxypolyethoxyethyl (m in Formula (8) = 23) methacrylate
X-1: Unit of methoxypoly(p = 150)ethylene glycol methacrylate
X-2: Unit of methoxypoly(p = 3)ethylene glycol methacrylate
X-3: Unit of sodium styrene sulfonate
X-4: Unit of 2-hydroxyethyl methacrylate Part 2 (Preparation and Evaluation of Concrete)
Preparation of Concrete Each of the test examples of concrete was prepared by placing ordinary portland cement (specific weight=3.16, Braine value=3300), fine aggregates (sand from Ooi River with specific weight=2.63) and coarse aggregates (crushed stone from Okazaki with specific weight=2.66) sequentially into a 50-liter pan-type forced kneading mixer under the conditions shown in Table 3 and kneaded for 15 seconds. Next, the cement dispersants prepared in Part 1 were added together with kneading water at a rate of 0.1–1.5 weight % with respect to the cement converted to solid components such that the target slump value would be within the range of 21±1 cm and the mixture was kneaded for 2 minutes. An agent for controlling the amount of air was kneaded in with water in each case such that the target air content would become 4.0–5.0%.

TABLE 3

| Condition of Preparation | Water/Cement Ratio (%) | Sand-Coarse Aggregate Ratio (%) | Used materials (kg/m³) | | | |
|---|---|---|---|---|---|---|
| | | | Water | Cement | Fine aggregate | Coarse aggregate |
| 1 | 33 | 44 | 165 | 500 | 742 | 944 |
| 2 | 50 | 49 | 165 | 330 | 867 | 960 |

Evaluation of Concrete

For each of test and comparison examples, slump value (SV), air quantity (AQ), setting time and compression strength were measured according respectively to JIS-A 1101, JIS-A 1128, JIS-A6204 and JIS-A 1108 immediately after the kneading (t=O), 60 minutes later (t=60) and 90 minutes later (t=90). The results are shown in Tables 4–7. In these Tables, the numbers in parentheses following the test and comparison example numbers indicate the condition of preparation defined in Table 3. Slump ratio is defined as the percentage ratio of the slump value after 90 minutes to the slump value immediately after the kneading.

These tables clearly show that cement dispersants according to this invention can provide a high level of fluidity while limiting the slump loss, as well as a high early strength at the initial period of hardening.

TABLE 4

| Test No. | Cement dispersant | | t = 0 | | t = 60 | | t = 90 | | Slump Ratio (%) |
|---|---|---|---|---|---|---|---|---|---|
| | Kind | Amount (Part)(*1) | SV (cm) | AQ (%) | SV (cm) | AQ (%) | SV (cm) | AQ (%) | |
| | Test Examples | | | | | | | | |
| 1 | 1(1) | 0.22 | 21.5 | 4.5 | 20.4 | 4.4 | 19.6 | 4.4 | 91.1 |
| 2 | 2(1) | 0.20 | 21.7 | 4.8 | 20.7 | 4.6 | 19.8 | 4.5 | 91.2 |
| 3 | 3(1) | 0.22 | 21.8 | 4.6 | 20.2 | 4.5 | 19.4 | 4.2 | 89.0 |
| 4 | 4(1) | 0.27 | 21.5 | 4.5 | 21.0 | 4.3 | 19.9 | 4.0 | 92.5 |
| 5 | 5(1) | 0.34 | 21.3 | 4.7 | 19.9 | 4.3 | 18.7 | 4.1 | 87.8 |
| 6 | 6(1) | 0.28 | 21.5 | 4.4 | 20.6 | 4.2 | 19.5 | 4.0 | 90.7 |
| 7 | 7(1) | 0.21 | 21.2 | 4.6 | 19.6 | 4.4 | 18.4 | 4.2 | 86.8 |
| 8 | 1(2) | 0.19 | 21.4 | 4.6 | 20.3 | 4.5 | 19.9 | 4.3 | 89.2 |
| 9 | 2(2) | 0.18 | 21.5 | 4.7 | 20.7 | 4.5 | 19.4 | 4.4 | 90.2 |
| 10 | 3(2) | 0.20 | 21.7 | 4.6 | 20.1 | 4.3 | 18.8 | 4.3 | 86.6 |
| 11 | 4(2) | 0.24 | 21.4 | 4.6 | 20.3 | 4.5 | 19.5 | 4.5 | 91.1 |
| 12 | 5(2) | 0.30 | 21.8 | 4.7 | 20.1 | 4.5 | 18.7 | 4.3 | 85.8 |
| 13 | 6(2) | 0.24 | 21.4 | 4.6 | 20.7 | 4.5 | 19.3 | 4.3 | 90.2 |
| 14 | 7(2) | 0.19 | 21.6 | 4.4 | 20.0 | 4.4 | 18.6 | 4.2 | 86.1 |
| 15 | 8(1) | 0.18 | 21.7 | 4.6 | 20.5 | 4.4 | 20.2 | 4.3 | 93.1 |
| 16 | 9(1) | 0.17 | 21.5 | 4.5 | 21.0 | 4.5 | 19.8 | 4.3 | 92.1 |
| 17 | 10(1) | 0.21 | 21.4 | 4.6 | 20.9 | 4.4 | 20.4 | 4.4 | 95.3 |
| 18 | 11(1) | 0.26 | 21.6 | 4.4 | 20.8 | 4.4 | 20.1 | 4.2 | 93.1 |
| 19 | 12(1) | 0.24 | 21.3 | 4.7 | 20.4 | 4.3 | 19.7 | 4.1 | 92.5 |
| 20 | 13(1) | 0.16 | 21.6 | 4.5 | 20.5 | 4.2 | 19.9 | 4.0 | 91.7 |
| 21 | 8(2) | 0.15 | 21.5 | 4.4 | 20.7 | 4.2 | 19.4 | 4.2 | 90.2 |
| 22 | 9(2) | 0.14 | 21.8 | 4.6 | 21.0 | 4.3 | 19.9 | 4.2 | 91.3 |
| 23 | 10(2) | 0.22 | 21.6 | 4.5 | 21.1 | 4.5 | 20.2 | 4.3 | 92.5 |
| 24 | 11(2) | 0.25 | 21.3 | 4.7 | 20.4 | 4.6 | 19.5 | 4.4 | 91.5 |
| 25 | 12(2) | 0.23 | 21.7 | 4.8 | 20.3 | 4.5 | 19.7 | 4.3 | 90.8 |
| 26 | 13(2) | 0.19 | 21.5 | 4.5 | 20.6 | 4.4 | 19.4 | 4.2 | 90.2 |

*1: The amount of cement dispersant is shown as converted to solid components with respect to 100 parts of cement.
(1), (2): Condition No. for preparation of concrete

TABLE 5

| Test No. | Cement dispersant Kind | Cement dispersant Amount (Part)(*1) | t = 0 SV (cm) | t = 0 AQ (%) | t = 60 SV (cm) | t = 60 AQ (%) | t = 90 SV (cm) | t = 90 AQ (%) | Slump Ratio (%) |
|---|---|---|---|---|---|---|---|---|---|
| | Comparative Examples | | | | | | | | |
| 27 | 1(1) | 0.280 | 21.5 | 4.9 | 17.1 | 4.4 | 13.4 | 4.4 | 64.5 |
| 28 | 2(1) | 0.30 | 21.7 | 4.6 | 16.0 | 4.5 | 12.1 | 4.2 | 57.9 |
| 29 | 3(1) | 0.55 | 21.2 | 4.5 | 15.0 | 4.3 | 11.8 | 4.0 | 72.4 |
| 30 | 4(1) | 0.45 | 21.3 | 4.4 | 17.7 | 4.1 | 15.2 | 4.1 | 76.7 |
| 31 | 5(1) | 0.29 | 21.6 | 4.6 | 17.3 | 4.4 | 14.6 | 4.2 | 70.8 |
| 32 | 6(1) | 0.60 | 21.2 | 4.8 | 16.4 | 4.6 | 12.9 | 4.2 | 60.7 |
| 33 | 7(1) | 0.35 | 21.4 | 4.8 | 15.0 | 4.5 | 10.8 | 4.1 | 50.5 |
| 34 | 8(1) | 0.43 | 21.6 | 4.6 | 13.8 | 4.6 | 9.2 | 4.4 | 47.9 |
| 35 | 9(1) | 0.31 | 21.3 | 4.7 | 15.5 | 4.6 | 12.5 | 4.4 | 62.0 |
| 36 | 10(1) | 0.95 | 21.2 | 4.8 | 14.5 | 4.6 | 10.7 | 4.3 | 45.0 |
| 37 | 11(1) | 0.49 | 21.7 | 4.8 | 15.2 | 4.6 | 11.8 | 4.5 | 54.3 |
| 38 | 12(1) | 0.47 | 21.4 | 4.6 | 15.7 | 4.4 | 12.0 | 4.1 | 56.1 |
| 39 | 1(2) | 0.27 | 21.6 | 4.7 | 15.7 | 4.4 | 13.3 | 4.2 | 61.6 |
| 40 | 2(2) | 0.29 | 21.3 | 4.6 | 15.0 | 4.3 | 10.1 | 4.1 | 47.4 |
| 41 | 3(2) | 0.48 | 21.5 | 4.9 | 17.0 | 4.6 | 15.0 | 4.5 | 69.8 |
| 42 | 4(2) | 0.42 | 21.8 | 4.5 | 17.2 | 4.4 | 15.6 | 4.3 | 71.6 |
| 43 | 5(2) | 0.27 | 21.4 | 4.6 | 16.9 | 4.5 | 13.9 | 4.5 | 65.0 |
| 44 | 6(2) | 0.58 | 21.7 | 4.5 | 13.5 | 4.4 | 11.2 | 4.2 | 51.6 |
| 45 | 7(2) | 0.32 | 21.5 | 4.7 | 12.8 | 4.5 | 10.4 | 4.4 | 48.4 |
| 46 | 8(2) | 0.40 | 21.4 | 4.8 | 12.0 | 4.7 | 9.2 | 4.2 | 43.0 |
| 47 | 9(2) | 0.30 | 21.6 | 4.6 | 16.2 | 4.4 | 13.0 | 4.4 | 60.2 |
| 48 | 10(2) | 0.90 | 21.7 | 4.8 | 12.1 | 4.5 | 9.1 | 4.4 | 41.9 |
| 49 | 11(2) | 0.45 | 21.9 | 4.7 | 12.8 | 4.5 | 12.2 | 4.3 | 41.4 |
| 50 | 12(2) | 0.42 | 21.3 | 4.9 | 13.0 | 4.4 | 11.4 | 4.1 | 53.5 |
| 51 | 13(1) | 0.47 | 21.8 | 4.8 | 15.2 | 4.4 | 11.0 | 4.1 | 50.5 |
| 52 | 14(1) | 0.36 | 21.5 | 4.6 | 14.4 | 4.3 | 10.3 | 4.3 | 47.9 |
| 53 | 15(1) | 0.58 | 21.3 | 4.7 | 16.0 | 4.4 | 13.2 | 4.4 | 62.0 |
| 54 | 13(2) | 0.53 | 21.6 | 4.6 | 12.8 | 4.5 | 10.4 | 4.3 | 48.1 |
| 55 | 14(2) | 0.34 | 21.2 | 4.8 | 12.3 | 4.6 | 9.7 | 4.4 | 45.8 |
| 56 | 15(2) | 0.50 | 21.5 | 4.5 | 16.7 | 4.5 | 13.2 | 4.3 | 61.4 |
| 57 | *2(1) | 0.76 | 21.7 | 4.6 | 11.2 | 4.2 | 9.0 | 4.0 | 41.4 |

*1: The amount of cement dispersant is shown as converted to solid components with respect to 100 parts of cement.
*2: Salt of high condensates of naphthalene sulfonic acid formaldehyde (Polefine 510-AN, tradename of Takemoto Yushi Kabushiki Kaisha)
(1), (2): Condition No. for preparation of concrete

TABLE 6

| Test No. | Setting Time Start (min) | Setting Time End (min) | Compressive Strength (N/mm²) Time (8h) | Time (12h) | Time (18h) | Time (24h) | Time (72h) |
|---|---|---|---|---|---|---|---|
| 1 | 335 | 415 | 1.7 | 9.7 | 22.2 | 36.5 | 53.7 |
| 2 | 320 | 400 | 2.0 | 10.1 | 22.5 | 38.8 | 54.0 |
| 3 | 300 | 370 | 2.5 | 12.0 | 24.0 | 43.0 | 55.6 |
| 4 | 340 | 435 | 1.4 | 9.0 | 21.3 | 36.0 | 53.5 |
| 5 | 355 | 450 | 1.1 | 8.8 | 21.0 | 35.7 | 53.0 |
| 6 | 330 | 410 | 1.9 | 9.8 | 22.0 | 39.0 | 54.3 |
| 7 | 305 | 365 | 2.6 | 12.5 | 24.5 | 44.0 | 55.8 |
| 8 | 340 | 420 | 0.9 | 3.5 | 6.7 | 16.6 | 26.8 |
| 9 | 320 | 405 | 1.0 | 3.7 | 6.9 | 16.7 | 27.1 |
| 10 | 315 | 395 | 1.3 | 3.9 | 7.0 | 16.9 | 27.3 |
| 11 | 355 | 455 | 0.7 | 3.3 | 6.5 | 16.2 | 26.4 |
| 12 | 360 | 465 | 0.7 | 3.2 | 6.3 | 16.0 | 26.2 |
| 13 | 330 | 425 | 0.9 | 3.5 | 6.7 | 16.8 | 27.0 |
| 14 | 310 | 390 | 1.3 | 4.0 | 7.0 | 17.0 | 27.4 |
| 15 | 310 | 385 | 2.0 | 10.2 | 22.5 | 38.6 | 53.8 |
| 16 | 300 | 375 | 2.4 | 12.0 | 24.0 | 43.5 | 55.7 |
| 17 | 330 | 405 | 1.7 | 9.6 | 22.0 | 36.2 | 54.0 |
| 18 | 335 | 420 | 1.5 | 9.3 | 21.7 | 35.7 | 53.0 |
| 19 | 330 | 410 | 1.7 | 9.5 | 22.1 | 36.0 | 53.1 |
| 20 | 305 | 390 | 2.2 | 11.8 | 24.0 | 43.6 | 55.6 |
| 21 | 320 | 410 | 1.0 | 3.7 | 6.8 | 16.6 | 26.9 |
| 22 | 310 | 395 | 1.2 | 3.9 | 7.0 | 16.8 | 27.2 |
| 23 | 355 | 450 | 0.8 | 3.4 | 6.5 | 16.4 | 26.5 |
| 24 | 360 | 460 | 0.7 | 3.4 | 6.6 | 16.5 | 26.5 |
| 25 | 350 | 445 | 0.8 | 3.6 | 6.5 | 16.7 | 26.6 |
| 26 | 335 | 420 | 0.9 | 3.5 | 6.6 | 16.6 | 26.7 |

TABLE 7

| Test No. | Setting Time Start (min) | Setting Time End (min) | Compressive Strength (N/mm²) Time (8h) | Time (12h) | Time (18h) | Time (24h) | Time (72h) |
|---|---|---|---|---|---|---|---|
| 27 | 380 | 490 | 0.3 | 1.2 | 9.6 | 14.8 | 45.7 |
| 28 | 410 | 530 | 0.1 | 0.7 | 9.0 | 13.5 | 43.7 |
| 29 | 470 | 590 | *3 | 0.1 | 2.9 | 6.6 | 42.5 |
| 30 | 430 | 550 | *3 | 0.2 | 4.2 | 7.7 | 43.0 |
| 31 | 380 | 485 | 0.4 | 1.7 | 11.1 | 17.0 | 47.7 |
| 32 | 500 | 620 | *3 | *3 | 1.8 | 6.4 | 42.3 |
| 33 | 425 | 540 | *3 | 0.5 | 4.3 | 8.0 | 44.5 |
| 34 | 450 | 580 | *3 | 0.2 | 2.9 | 7.0 | 43.9 |

TABLE 7-continued

| Test No. | Setting Time | | Compressive Strength (N/mm²) | | | | |
|---|---|---|---|---|---|---|---|
| | Start (min) | End (min) | Time (8h) | Time (12h) | Time (18h) | Time (24h) | Time (72h) |
| 35 | 480 | 605 | *3 | *3 | 2.5 | 6.5 | 42.8 |
| 36 | 650 | 780 | *3 | *3 | *3 | 1.5 | 41.0 |
| 37 | 440 | 575 | *3 | *3 | 0.4 | 7.0 | 43.8 |
| 38 | 495 | 590 | *3 | *3 | 0.2 | 3.1 | 43.0 |
| 39 | 405 | 540 | *3 | 0.2 | 3.1 | 8.5 | 22.0 |
| 40 | 420 | 560 | *3 | *3 | 1.8 | 7.5 | 21.6 |
| 41 | 510 | 645 | *3 | *3 | *3 | 2.7 | 19.7 |
| 42 | 450 | 590 | *3 | *3 | *3 | 2.0 | 20.2 |
| 43 | 400 | 535 | *3 | 0.3 | 3.5 | 10.0 | 23.4 |
| 44 | 535 | 690 | *3 | *3 | *3 | 0.4 | 18.5 |
| 45 | 445 | 585 | *3 | *3 | *3 | 3.6 | 21.2 |
| 46 | 480 | 620 | *3 | *3 | *3 | 3.0 | 20.7 |
| 47 | 460 | 600 | *3 | *3 | 0.2 | 1.9 | 20.6 |
| 48 | 620 | 785 | *3 | *3 | *3 | *3 | 15.7 |
| 49 | 490 | 635 | *3 | *3 | *3 | 0.8 | 19.5 |
| 50 | 540 | 680 | *3 | *3 | *3 | *3 | 17.6 |
| 51 | 530 | 675 | *3 | *3 | 0.9 | 3.6 | 39.5 |
| 52 | 455 | 590 | *3 | 0.2 | 2.7 | 6.3 | 41.5 |
| 53 | 550 | 695 | *3 | *3 | 0.4 | 2.5 | 35.5 |
| 54 | 540 | 690 | *3 | *3 | *3 | 0.3 | 18.5 |
| 55 | 465 | 600 | *3 | *3 | *3 | 1.9 | 19.0 |
| 56 | 530 | 670 | *3 | *3 | *3 | 0.5 | 19.8 |
| 57 | 360 | 445 | 0.7 | 3.0 | 16.2 | 28.9 | 51.7 |

*3: No measurement could be taken because there was no hardening.

What is claimed is:

1. A cement dispersant constituting of water-soluble vinyl copolymers including 40–80 molar % of Unit A shown below by Formula (1), 0.5–20 molar % of Unit B shown below by Formula (2), 0.2–18 molar % of Unit C shown below by Formula (3) and 2–40 molar % of Unit D shown below by Formula (4), total content of said Units A, B, C and D being 100 molar %, said water-soluble vinyl copolymers having weight average molecular weight pullulan converted by GPC method 15000–150000 and ratio of weight average molecular weight to number average molecular weight 2–7, Formulas (1)–(4) being given by:

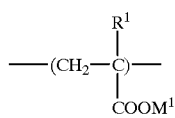
(Formula 1)

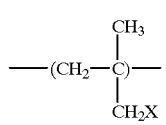
(Formula 2)

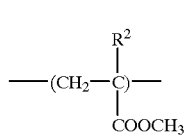
(Formula 3)

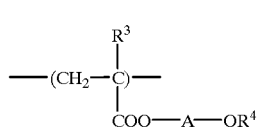
(Formula 4)

where $R^1$, $R^2$ and $R^3$ are each H or $CH_3$, $R^4$ is H or an alkyl group with 1–3 carbon atoms, X is a group shown below by Formula (5) or (6), —$SO_3M^2$ (Formula 5)

—O—$C_6H_4$—$SO_3M^3$ (Formula 6)

A is a residual group obtainable by removing all hydroxyl groups from polyether diol with repetition number of oxyalkylene units 5–109, said oxyalkylene units consisting either only of oxyethylene units or of both oxyethylene and oxypropylene units, $M^1$ is H, an alkali metal, an alkali earth metal, ammonium or an organic amine, and $M^2$ and $M^3$ are each an alkali metal, an alkali earth metal, ammonium or an organic amine.

2. The cement dispersant of claim 1 wherein said Unit D consists of Unit E shown below by Formula (7) and Unit F shown below by Formula (8), said water-soluble vinyl copolymers containing said Unit E by 2–15 molar % and said Unit F by 0.5–15 molar %:

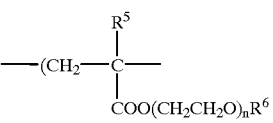
(Formula 7)

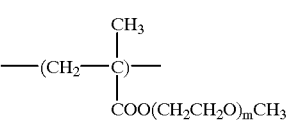
(Formula 8)

where $R^5$ is H or $CH_3$, $R^6$ is an alkyl group with 1–3 carbon atoms, n is an integer 40–109 and m is an integer 5–25.

3. The cement dispersant of claim 2 wherein said water-soluble vinyl copolymers contain said Unit A by 55–72 molar %, said Unit B by 3–18 molar %, said Unit C by 3–15 molar %, said Unit E by 3–12 molar % and said Unit F by 1–12 molar %.

4. The cement dispersant of claim 1 wherein said water-soluble vinyl copolymers have weight average molecular weight pullulan converted by GPC method 25000–70000 and ratio of weight average molecular weight to number average molecular weight 3–6.5.

5. The cement dispersant of claim 2 wherein said water-soluble vinyl copolymers have weight average molecular weight pullulan converted by GPC method 25000–70000 and ratio of weight average molecular weight to number average molecular weight 3–6.5.

6. The cement dispersant of claim 3 wherein said water-soluble vinyl copolymers have weight average molecular weight pullulan converted by GPC method 25000–70000 and ratio of weight average molecular weight to number average molecular weight 3–6.5.

7. A method of producing concrete, said method comprising the step of mixing cement, aggregates, a cement dispersant and water such that concrete with water-to-cement ratio of 20–45% is produced, said cement dispersant consisting of water-soluble vinyl copolymers including 40–80 molar % of Unit A shown below by Formula (1), 0.5–20 molar % of Unit B shown below by Formula (2), 0.2–18 molar % of Unit C shown below by Formula (3) and 2–40 molar % of Unit D shown below by Formula (4), total content of said Units A, B, C and D being 100 molar %, said water-soluble vinyl copolymers having weight average molecular weight pullulan converted by GPC method 15000–150000 and ratio of weight average molecular weight to number average molecular weight 2–7, Formulas (1)–(4) being given by:

(Formula 1)
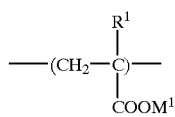

(Formula 2)
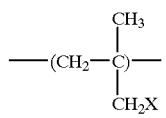

(Formula 3)
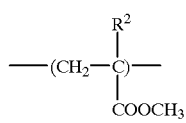

(Formula 4)
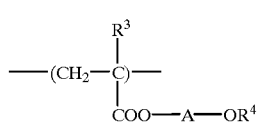

where $R^1$, $R^2$ and $R^3$ are each H or $CH_3$, $R^4$ is H or an alkyl group with 1–3 carbon atoms, X is a group shown below by Formula (5) or (6), —$SO_3M^2$ (Formula 5)

—O—$C_6H_4$—$SO_3M^3$ (Formula 6)

A is a residual group obtainable by removing all hydroxyl groups from polyether diol with repetition number of oxyalkylene units 5–109, said oxyalkylene units consisting either only of oxyethylene units or of both oxyethylene and oxypropylene units, $M^1$ is H, an alkali metal, an alkali earth metal, ammonium or an organic amine, and $M^2$ and $M^3$ are each an alkali metal, an alkali earth metal, ammonium or an organic amine.

8. The method of claim 7 wherein said Unit D consists of Unit E shown below by Formula (7) and Unit F shown below by Formula (8), said water-soluble vinyl copolymers containing said Unit E by 2–15 molar % and said Unit F by 0.5–15 molar %:

(Formula 7)
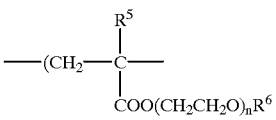

(Formula 8)
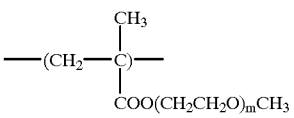

where $R^5$ is H or $CH_3$, $R^6$ is an alkyl group with 1–3 carbon atoms, n is an integer 40–109 and m is an integer 5–25.

9. The method of claim 8 wherein said water-soluble vinyl copolymers contain said Unit A by 55–72 molar %, said Unit B by 3–18 molar %, said Unit C by 3–15 molar %, said Unit E by 3–12 molar % and said Unit F by 1–12 molar %.

10. The method of claim 7 wherein said water-soluble vinyl copolymers have weight average molecular weight pullulan converted by GPC method 25000–70000 and ratio of weight average molecular weight to number average molecular weight 3–6.5.

11. The method of claim 8 wherein said water-soluble vinyl copolymers have weight average molecular weight pullulan converted by GPC method 25000–70000 and ratio of weight average molecular weight to number average molecular weight 3–6.5.

12. The method of claim 9 wherein said water-soluble vinyl copolymers have weight average molecular weight pullulan converted by GPC method 25000–70000 and ratio of weight average molecular weight to number average molecular weight 3–6.5.

* * * * *